(12) United States Patent
Wu

(10) Patent No.: US 6,966,664 B2
(45) Date of Patent: Nov. 22, 2005

(54) LINEAR LIGHT SOURCE HAVING INDENTED REFLECTING PLANE

(75) Inventor: Rong-Yaw Wu, Hsin-Tien (TW)

(73) Assignee: Pixon Technologies Corp., Taipei Hsien (TW)

( * ) Notice: Subject to any disclaimer, the term of this patent is extended or adjusted under 35 U.S.C. 154(b) by 244 days.

(21) Appl. No.: 10/633,528

(22) Filed: Aug. 5, 2003

(65) Prior Publication Data

US 2004/0252522 A1 Dec. 16, 2004

(30) Foreign Application Priority Data

Jun. 13, 2003 (TW) ........................................ 92116083 A

(51) Int. Cl.$^7$ ................................................. F21V 8/00
(52) U.S. Cl. .................................... 362/31; 362/555
(58) Field of Search ............................... 362/31, 27, 30, 362/800, 555, 243, 327, 240, 236

(56) References Cited

U.S. PATENT DOCUMENTS

| | | | | |
|---|---|---|---|---|
| 5,810,463 A | * | 9/1998 | Kawahara et al. | .......... 362/601 |
| 6,204,938 B1 | * | 3/2001 | Horiuchi et al. | ............ 358/484 |
| 6,206,534 B1 | * | 3/2001 | Jenkins et al. | .............. 362/600 |
| 6,461,007 B1 | * | 10/2002 | Akaoka | ...................... 362/610 |
| 6,540,368 B2 | * | 4/2003 | Akaoka | ...................... 362/610 |
| 6,786,626 B2 | * | 9/2004 | Wu et al. | .................... 362/555 |

* cited by examiner

Primary Examiner—Laura K. Tso
(74) Attorney, Agent, or Firm—Rosenberg, Klein & Lee

(57) ABSTRACT

A linear light source having an indented reflecting plane comprises a light guide bar and a light source component. The light guide bar is a polygonal cylinder having an arc-shaped plane. Any two opposed surfaces of the cylinder are an indented reflecting plane and an arc-shaped emission place, respectively. The other surfaces are composed of a plurality of reflecting layers. Through controlling the light-emission slope and height of the indented reflecting plane, the light will be more uniform. The brightness can also be enhanced through the light collecting effect of the arc-shaped emission plane. Moreover, the light source component can let the light emission angle of each LED be closer to accomplish a shorter useless region through the arrangement of the LEDs.

12 Claims, 8 Drawing Sheets

LINEAR LIGHT SOURCE HAVING INDENTED REFLECTING PLANE

FIELD OF THE INVENTION

The present invention relates to a linear light source having an indented reflecting plane and, more particularly, to a linear light source used in picture readout devices and liquid crystal modules. The linear light source provides a light guide bar having an indented reflecting plane and an arc-shaped emission plane. Through arrangement of LEDs in a light source component, the light collecting effect of the whole linear light source will be better and the light thereof will be more uniform.

BACKGROUND OF THE INVENTION

In picture readout devices such as scanners, fax machines, multi-function printers and copiers, a linear light source is required to illuminate an object in the background of liquid crystal. One method is making use of a linear light source and combining a light guide bar to convert the linear light source into a planar light source, thereby providing backlight for a liquid crystal panel.

FIG. 1 shows a linear light source used in picture readout devices and liquid crystal modules in U.S. Pub. application Ser. No. 10/288,444, wherein a convex polygonal light guide bar and a linear light source having a reflecting plane is disclosed. The linear light source 10' includes a light guide bar 20' and a light source component 30'. The light guide bar 20' is a convex polygonal cylinder, and includes an incident plane 220', an emission plane 240', a reflecting plane 230' and a plurality of reflecting layers 250'. Light of at least an LED of the light source component 30' first passes through the incident plane 220', is reflected in the reflecting layers 250' of the convex polygonal cylinder to the reflecting plane 230', and then is projected out via the emission plane 240'.

FIGS. 2A and 2B show showing surface processing of the reflecting plane disclosed in U.S. Pub. application Ser. No. 10/288,444. The inner surface of the reflecting plane is processed. There are two ways of processing the surface texture. One way is processing in sections to let each section have a different roughness for increasing/decreasing the reflection, refraction, and absorption coefficients. The surface with a high roughness has a large scattering capability and a large reflecting angle. On the contrary, the surface with a low roughness has a small scattering capability and a small reflecting angle, and whose light flux can be changed simultaneously. The other way is let the surface far away from the light source have a higher roughness and the surface near the light source have a low roughness.

Accordingly, the above disclosure mainly processes the surface of the reflecting plane to obtain a uniform light. However, how to enhance the uniformity and brightness of the emission light is still an important topic for research.

SUMMARY OF THE INVENTION

The primary object of the present invention is to provide a linear light source having an indented reflecting plane, wherein a light guide bar makes use of an indented reflecting plane to obtain a uniform reflected light, and an arc-shaped emission plane is used to collect light for enhancing the brightness.

Another object of the present invention is to provide a linear light source having an indented reflecting plane, wherein at least a red LED is placed between at least a blue LED and at least a green LED. These LEDs are placed in a circle with a diameter 1.12±0.1 mm to let the emission angles of different LEDs be closer, thereby obtaining a shorter useless region and letting the emission light be more uniform.

To achieve the above objects, the present invention provides a linear light source comprising a light guide bar and a light source component. The light guide bar is a polygonal cylinder having an arc-shaped plane. The cylinder has an incident plane for light incidence and located at the tail end of the cylinder. Any two opposed surfaces of the cylinder are an indented reflecting plane and an arc-shaped emission place, respectively. The other surfaces are composed of a plurality of reflecting layers. The slope of the indented reflecting plane of the light guide bar is controlled within 0.03~0.15 degree. Through controlling the light-emission slope and height of the indented reflecting plane, the light will be more uniform. The brightness can also be enhanced through the light collecting effect of the arc-shaped emission plane.

Moreover, the light source component can let the light emission angle of each LED be closer to accomplish a shorter useless region through the arrangement of the LEDs. At least a red LED is placed between at least a green LED and at least a blue LED. The arrangement area of the LEDs is restricted in a circle with a diameter 1.12±0.1 mm.

The various objects and advantages of the present invention will be more readily understood from the following detailed description when read in conjunction with the appended drawings, in which:

DETAILED DESCRIPTION OF THE PREFERRED EMBODIMENTS

The present invention improves the surface processing of a reflecting plane in a light guide bar and the shape of an emission plane and the placement position of LEDs of a light source component disclosed in JAPAN Pat. No. 2003-073059 to let light be more uniform and enhance the brightness.

Figure 1:
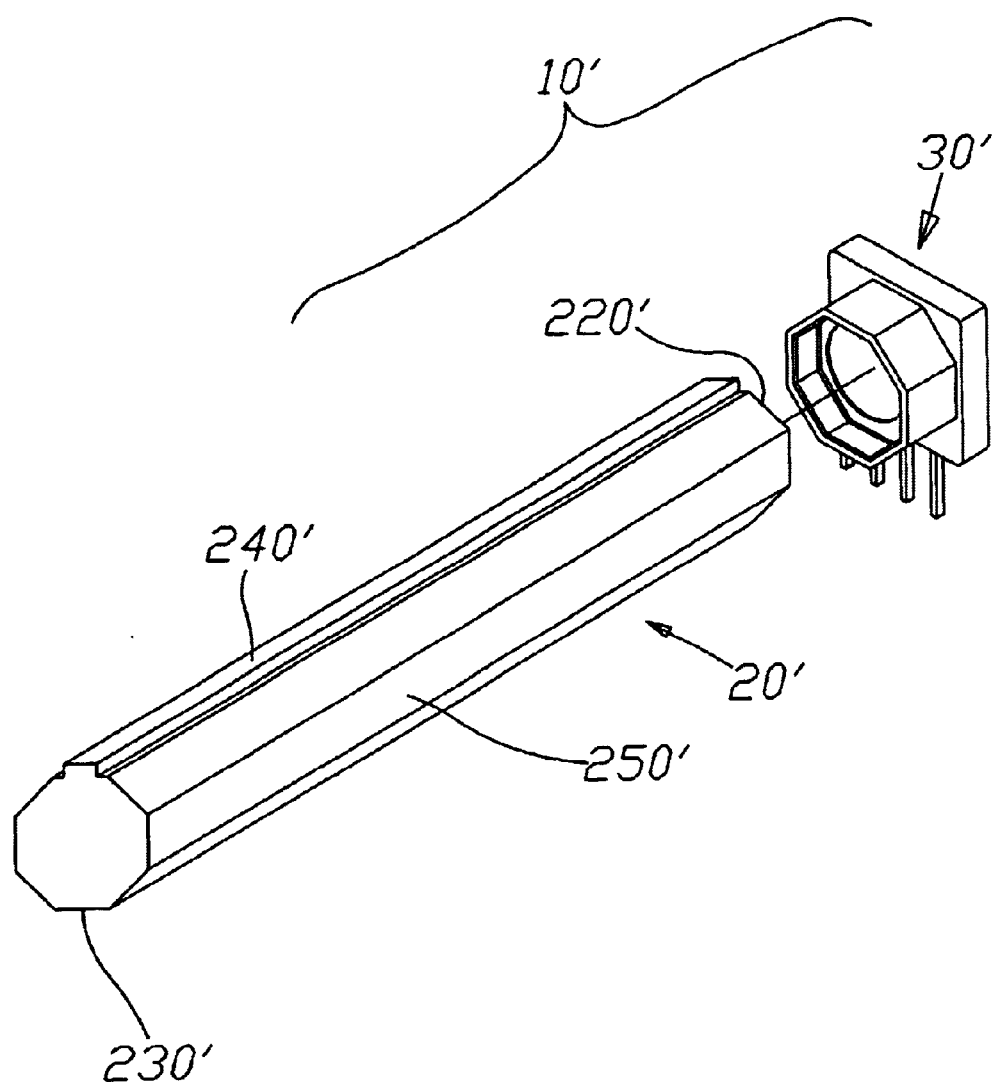
FIG. 1 is an exploded perspective view of a linear light source used in picture readout devices and liquid crystal modules in U.S. Pub. application. Ser. No. 10/288,444.
Figure 2A:
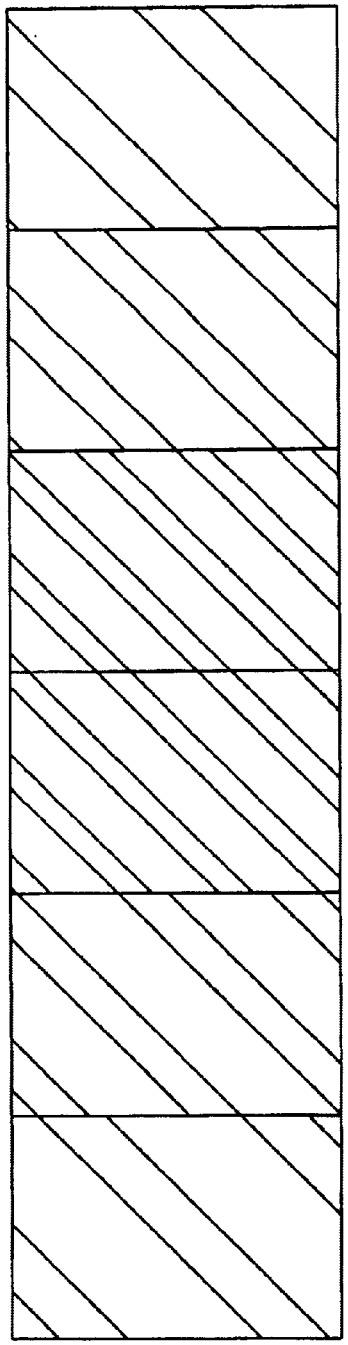
FIG. 2A is a diagram showing surface processing of the reflecting plane in U.S. Pub. application Ser. No. 10/288,444.
Figure 2B:
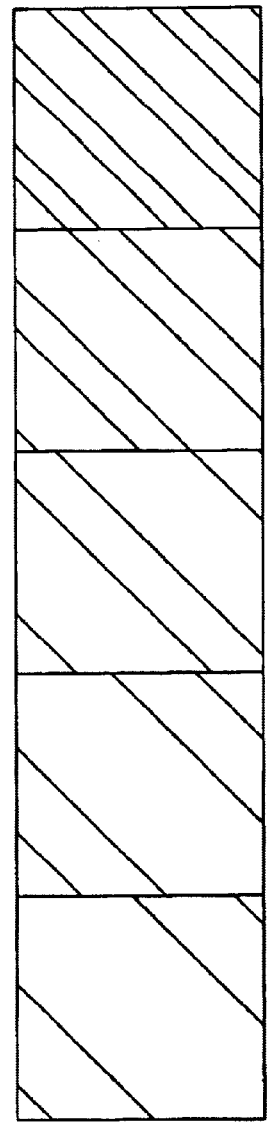
FIG. 2B is another diagram showing surface processing of the reflecting plane in U.S. Pub. application Ser. No. 10/288,444.
Figure 3:
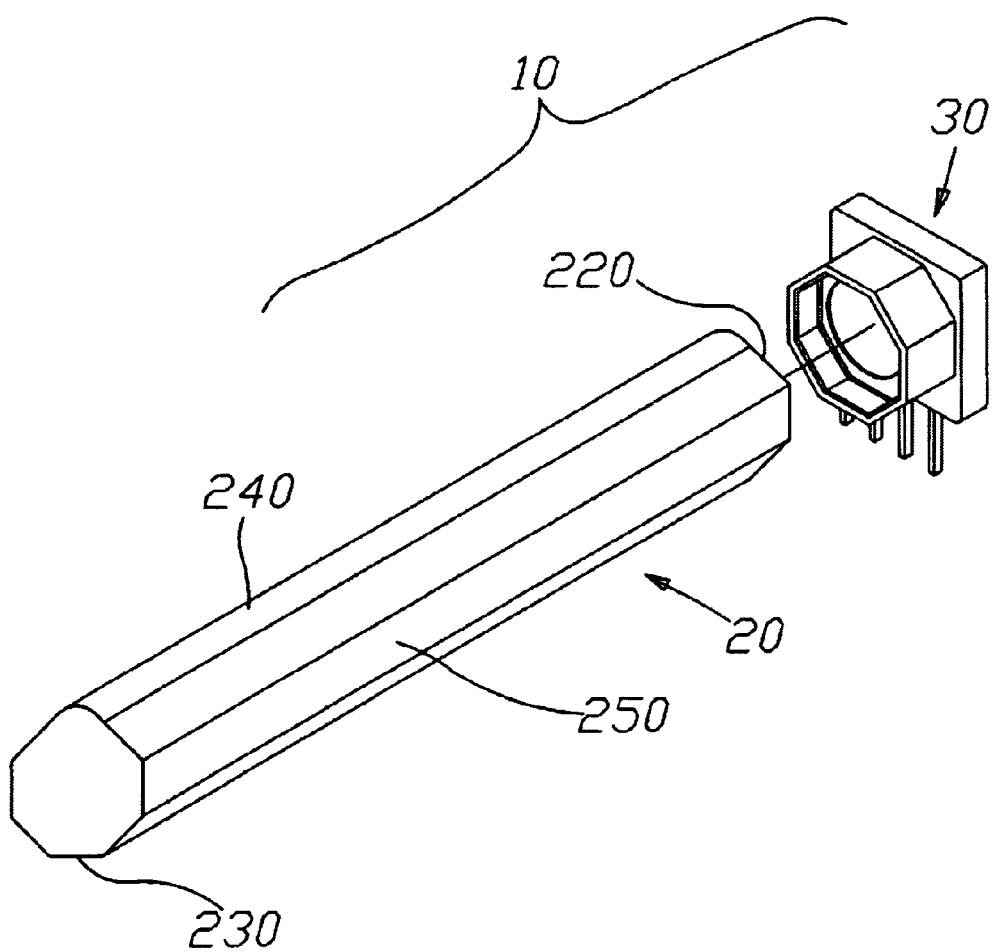
FIG. 3 is an exploded perspective view of a linear light source according to a preferred embodiment of the present invention.
Figure 4:
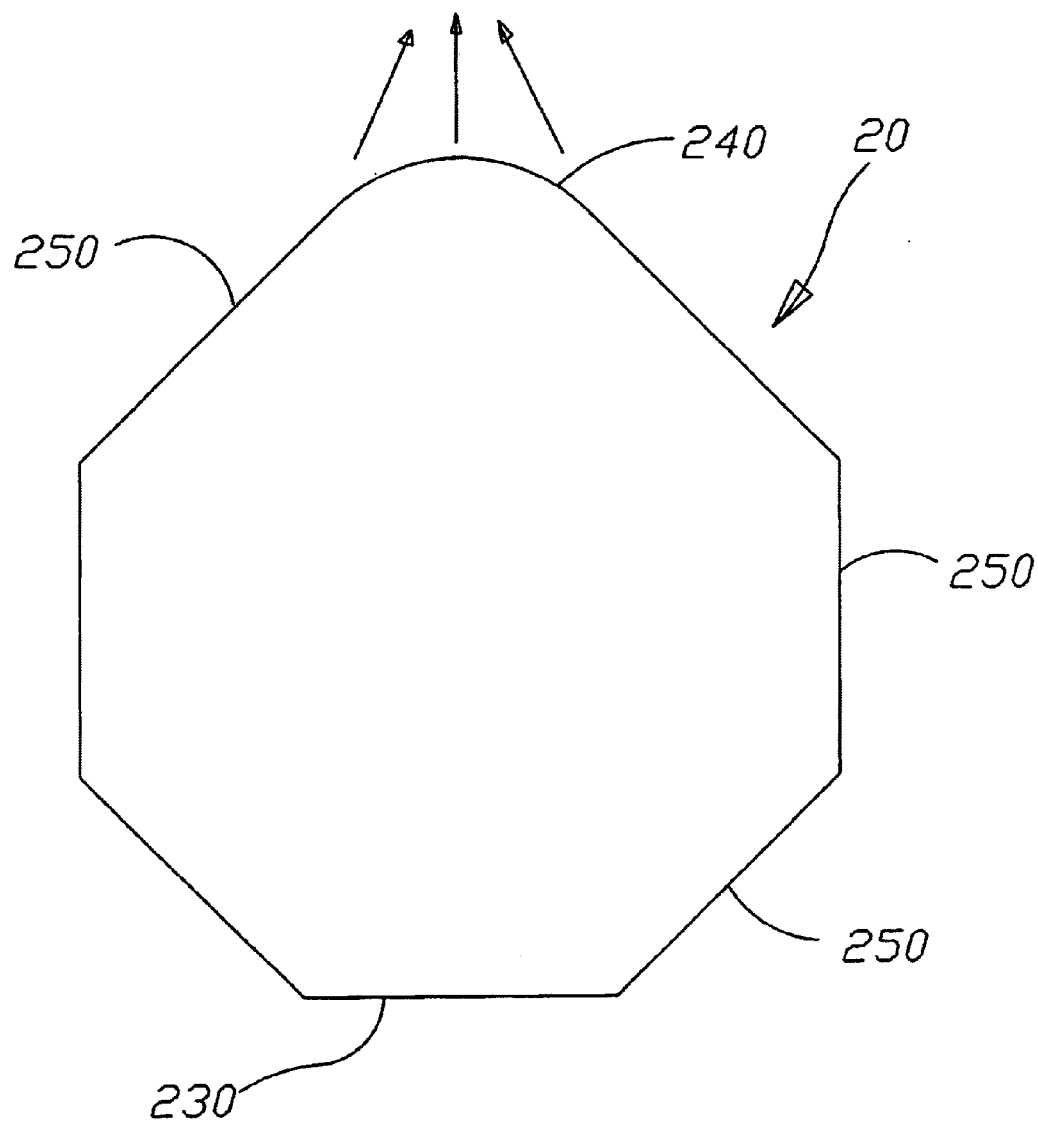
FIG. 4 is a cross-sectional view of a light guide bar according to a preferred embodiment of the present invention.

As shown in FIG. 3, a light source 10 comprises a light source component 30 and a light guide bar 20. The light guide bar 20 is a polygonal cylinder having an arc-shaped emission plane 240, and mainly includes at least an incident plane 220 for light of LEDs and a plurality of reflecting layers 250 and an indented reflecting plane 230. Please also refer to FIG. 4. The arc-shaped emission plane 240 has the function of condensing light to enhance the brightness of light. The radius of the arc-shaped emission plane is 0.73±0.1 mm.

Figure 5:
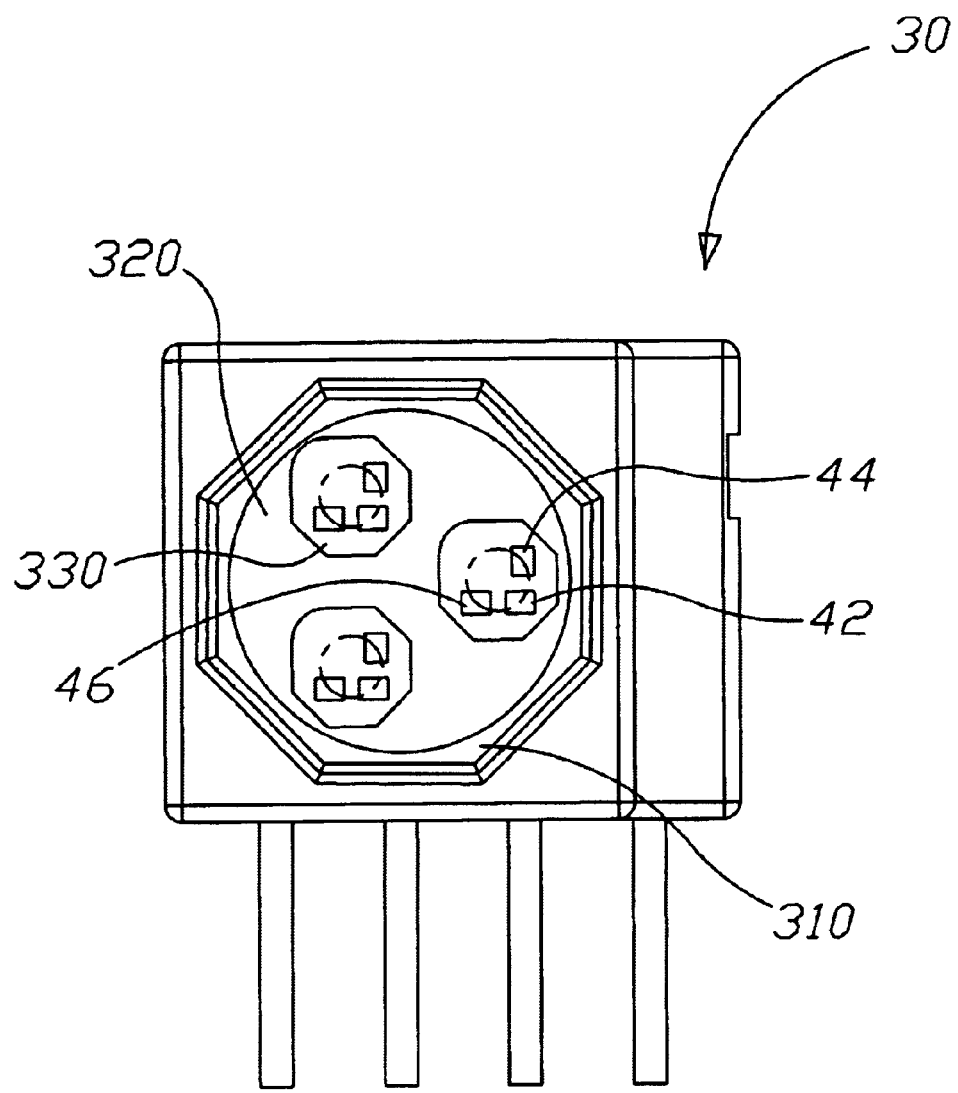
FIG. 5 is a view of a light source component according to a preferred embodiment of the present invention.

Please refer to FIG. 5 simultaneously. The light source component 30 includes an installation plane 310, a positioning plane 320 and a reflecting plane 330. It is also feasible that there are more than one reflecting plane.

Figure 6:
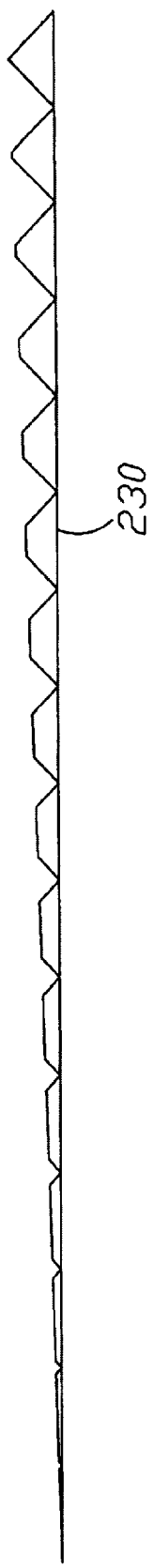
FIG. 6 is a view of an indented reflecting plane according to a preferred embodiment of the present invention.

As shown in FIG. 6, the reflecting plane of the light guide bar is an indented reflecting plane 230. The angle of elevation of the indentation is between 0.03~0.15 degree. The indented reflecting plane can be divided into many sections for processing. The angle of elevation (between the range of 0.03~0.15 degree) is also divided into many sections for processing. For instance, if the length of the reflecting plane is divided into two sections, the angle of elevation of the indentation of the first section is 0.03~0.09 degree, and the angle of elevation of the indentation of the second section is 0.09~0.15 degree. When the length of the reflecting plane is divided into many sections, the range of the angle of elevation of each section may be deduced by analogy.

How the indentation height and the length of the reflecting incline are calculated is illustrated below with the length of the reflecting plane divided into two sections.

1. The first section has an angle of elevation of the indentation between 0.03~0.09 degree:

$$X1 = (L1 - N1)\tan \theta 1 \quad (1)$$
$$Y1 = X1/\sin \phi 1 \quad (2)$$

wherein L1 is the distance to the distal end of the first section from the intersection point of the focus of LEDs extended leftwards and the horizontal axis (between 114~135 mm), θ1 is between 0.03~0.09, N1 is the length of the first section (between 1~111), X1 is the indentation height of the first section; Y1 is the length of the reflecting incline of the first section, and $\phi 1$ is the angle of the reflecting emission plane (30~40 degrees).

The indentation height of the first section is first calculated out by (1), and the length of the reflecting incline of the first section is then calculated out by (2).

2. The second section has an angle of elevation of the indentation between 0.09~0.15 degree:

$$X2 = (L2 - N2)\tan \theta 2 \quad (3)$$
$$Y2 = X2/\sin \phi 2 \quad (4)$$

wherein L2 is the distance to the distal end of the second section from the intersection point of the focus of LEDs extended leftwards and the horizontal axis (between 127~170 mm), θ2 is between 0.09~0.15, N2 is the length of the second section (between 1~111), X2 is the indentation height of the second section; Y2 is the length of the reflecting incline of the second section, and $\phi 2$ is the angle of the reflecting emission plane (30~40 degrees).

The indentation height of the second section is first calculated out by (3), and the length of the reflecting incline of the second section is then calculated out by (4).

Figure 7:
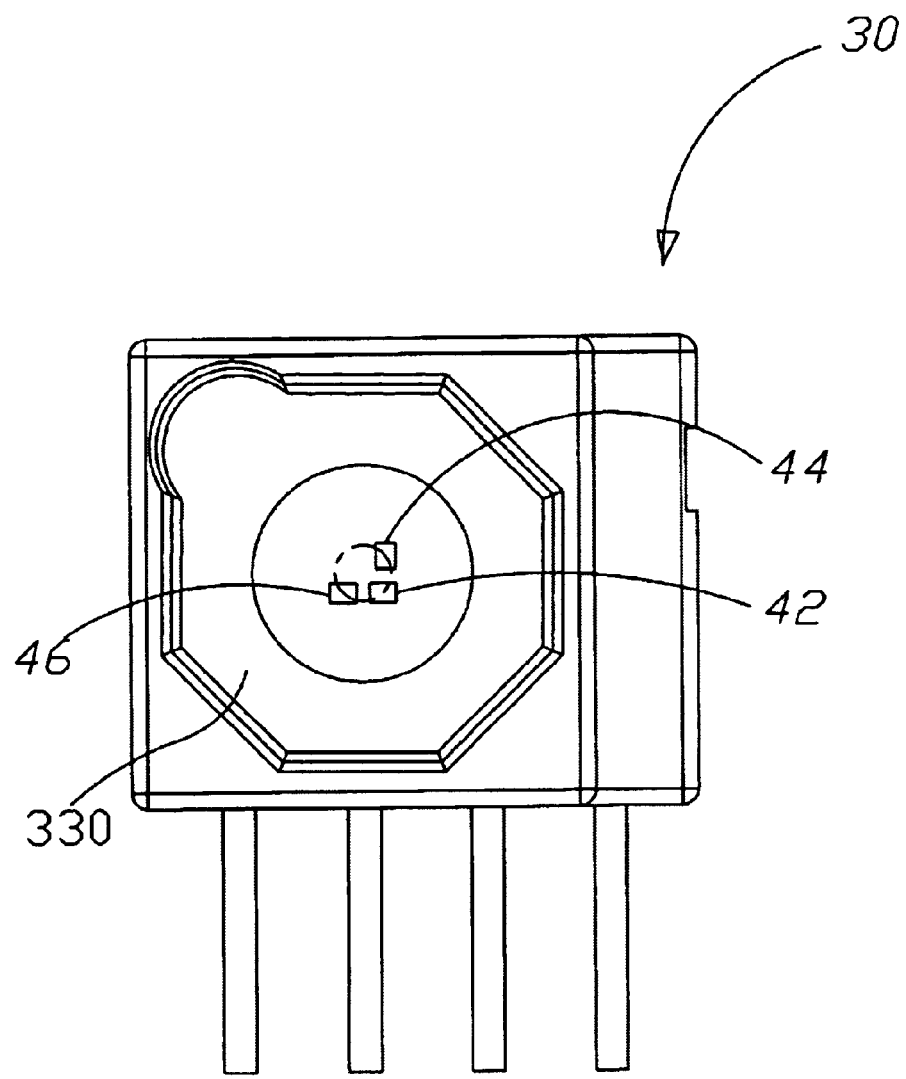
FIG. 7 is a view showing the placement positions of LEDs according to a preferred embodiment of the present invention.

As shown in FIG. 7, wherein the installation positions of LEDs of the three primary colors (red (R), green (G) and blue (B)) of the light source component 30 are disclosed to effectively shorten the useless region (region with non-uniform light). Because the wavelengths of the LEDs of the three primary colors are different, in order to let the emission angles thereof be closer, at least a red LED 42 is placed between at least a green LED 44 and at least a blue LED 46. A circle is plotted with the center of the LEDs as the center. The diameter of the circle is 1.12±0.1 mm. When the light source component 30 is tightly connected with the light guide bar 20, the useless region can be effectively reduced to let light be uniformly projected out after reflected in the light guide bar, thereby enhancing the quality of scanning.

Figure 8A:
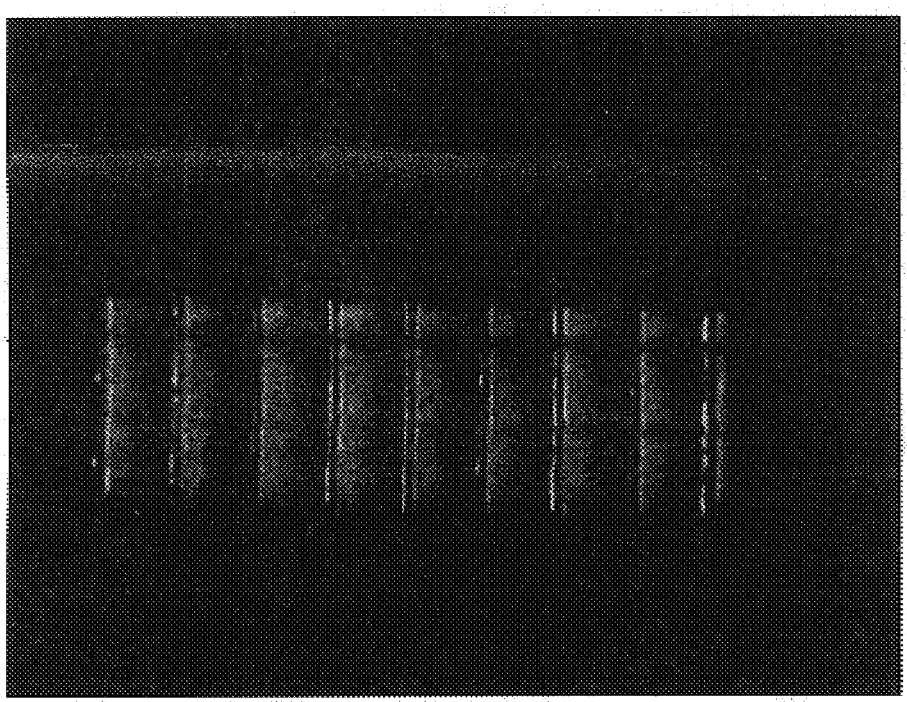
FIG. 8A is a test diagram of light uniformity of U.S. Pub. application Ser. No. 169,467.
Figure 8B:
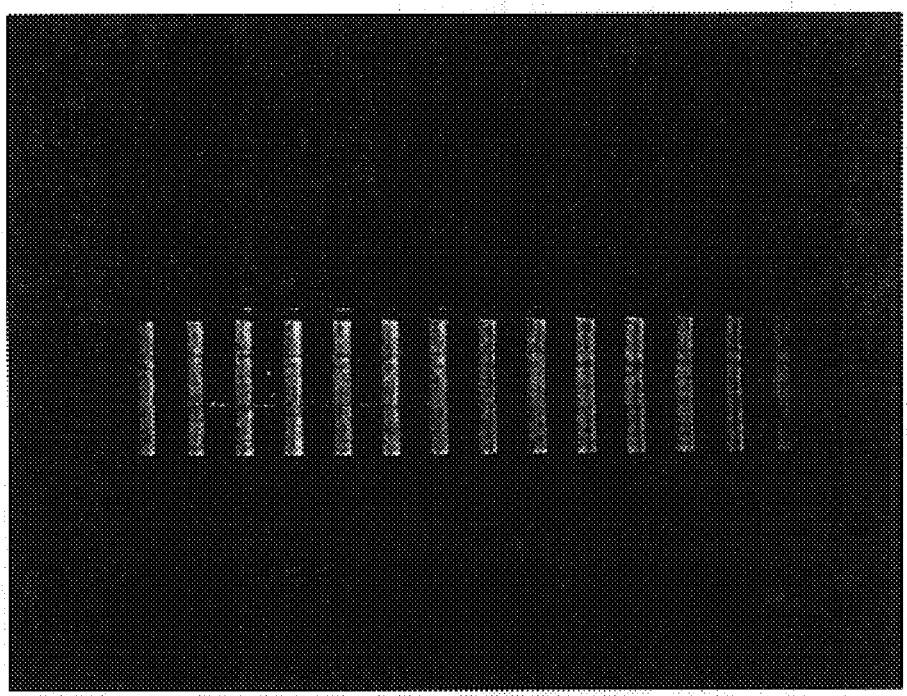
FIG. 8B is a test diagram of light uniformity according to a preferred embodiment of the present invention.

Please refer to FIGS. 8A and 8B. The present invention makes use of an indented reflecting plane and an arc-shaped emission plane. Because of the change of the emission area of the indented reflecting plane, light can be uniformly distributed on the reflecting plane. Moreover, through the light condensing effect of the arc-shaped emission plane, light can be condensed onto the reflecting plane of the object image to accomplish the optimum emission efficiency and uniformity. As compared to the conventional structure, the present invention can accomplish much better effects.

To sum up, the present invention proposes a linear light source, which comprises a light guide bar and a light source component. The light guide bar is a polygonal cylinder having an arc-shaped plane. Any two opposed surfaces of the cylinder are an indented reflecting plane and an arc-shaped emission place, respectively. The other surfaces are composed of a plurality of reflecting layers. Through controlling the light-emission slope and height of the indented reflecting plane, the light will be more uniform. The brightness can also be enhanced through the light collecting effect of the arc-shaped emission plane. Moreover, the light source component can let the light emission angle of each LED be closer to accomplish a shorter useless region through the arrangement of the LEDs.

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

I claim:

1. A linear light source having an indented reflecting plane at least comprising:

a light source component comprising an unclosed positioning plane, at least a reflecting plane and at least an installation plane, at least a red LED, at least a green LED and at least a blue LED being provided on said installation plane; and a light guide bar being a polygonal cylinder having an arc-shaped plane, said light guide bar comprising at least an arc-shaped emission plane, at least an indented reflecting plane and a plurality of reflecting layers, at least a tail end of said cylinder being used as an incident plane for light of said LEDs.

2. The linear light source having an indented reflecting plane as claimed in claim 1, wherein said positioning plane of said light source component is connected with said incident plane of said polygonal cylinder.

3. The linear light source having an indented reflecting plane as claimed in claim 1, wherein at least a red LED is located between said blue LED and said green LED.

4. The linear light source having an indented reflecting plane as claimed in claim 1, wherein said green LED, said red LED and said blue LED is placed within a circle with a diameter 1.12±0.1 mm.

5. The linear light source having an indented reflecting plane as claimed in claim 1, wherein the indentation angle of said indented reflecting plane lets light be uniformly reflected from the emission area of said indented reflecting plane onto said emission plane.

6. The linear light source having an indented reflecting plane as claimed in claim 1, wherein the angle of elevation of indentations of said indented reflecting plane is between 0.03~0.15 degree.

7. The linear light source having an indented reflecting plane as claimed in claim 1, wherein the angle of elevation of indentations of said indented reflecting plane can be distributed in two sections, the first being between 0.03~0.09 degree, and the second being between 0.09~0.15 degree.

8. The linear light source having an indented reflecting plane as claimed in claim 7, wherein the indentation height and the length of the reflecting incline of the first section are calculated by the following formula:

$$X1 = (L1 - N1)\tan\theta 1 \qquad (1)$$
$$Y1 = X1/\sin\phi 1 \qquad (2)$$

wherein L1 is the distance to the distal end of the first section from the intersection point of the focus of LEDs extended leftwards and the horizontal axis (between 114~135), θ1 is between 0.03~0.09 degree, N1 is the length of the first section (between 1~111), X1 is the indentation height of the first section; Y1 is the length of the reflecting incline of the first section, and $\phi 1$ is the angle of the reflecting emission plane (30~40 degrees).

9. The linear light source having an indented reflecting plane as claimed in claim 7, wherein the indentation height and the length of the reflecting incline of the second section are calculated by the following formula:

$$X2 = (L2 - N2)\tan\theta 2 \qquad (3)$$
$$Y2 = X2/\sin\phi 2 \qquad (4)$$

wherein L2 is the distance to the distal end of the second section from the intersection point of the focus of LEDs extended leftwards and the horizontal axis (between 127~170), θ2 is between 0.09~0.15 degree, N2 is the length of the second section (between 1~111), X2 is the indentation height of the second section, Y2 is the length of the reflecting incline of the second section, and $\phi 2$ is the angle of the reflecting emission plane (30~40 degrees).

10. The linear light source having an indented reflecting plane as claimed in claim 1, wherein the angle of elevation of indentations of said indented reflecting plane can be distributed in many sections according to the length of said reflecting plane.

11. The linear light source having an indented reflecting plane as claimed in claim 1, wherein the opposed end of said incident plane in said polygonal cylinder having an arc-shaped plane is a tail-end plane, which can reflect arriving light back into said cylinder.

12. The linear light source having an indented reflecting plane as claimed in claim 1, wherein the radius of said arc-shaped emission plane of said light guide bar is 0.73±0.1 mm.

* * * * *

UNITED STATES PATENT AND TRADEMARK OFFICE
CERTIFICATE OF CORRECTION

PATENT NO.   : 6,966,664 B2
DATED        : November 22, 2005
INVENTOR(S)  : Rong-Yaw Wu and Chih Ming Yen It is certified that error appears in the above-identified patent and that said Letters Patent is hereby corrected as shown below:

Title page,
Item [75], Inventors, add second inventor's name -- Chih Ming Yen, Taipei Hsien (TW) --.

Signed and Sealed this

Twenty-fourth Day of January, 2006

JON W. DUDAS
*Director of the United States Patent and Trademark Office*